(12) United States Patent
Lee et al.

(10) Patent No.: US 8,914,133 B2
(45) Date of Patent: Dec. 16, 2014

(54) POWER MANAGEMENT SYSTEM AND METHOD OF CONTROLLING NETWORK SYSTEM

(75) Inventors: Koonseok Lee, Seoul (KR); Hoonbong Lee, Seoul (KR); Yanghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 13/516,509

(22) PCT Filed: Nov. 26, 2010

(86) PCT No.: PCT/KR2010/008431
§ 371 (c)(1),
(2), (4) Date: Jun. 15, 2012

(87) PCT Pub. No.: WO2011/074799
PCT Pub. Date: Jun. 23, 2011

(65) Prior Publication Data
US 2012/0303172 A1    Nov. 29, 2012

(30) Foreign Application Priority Data

Dec. 17, 2009  (KR) .................. 10-2009-0126376
Dec. 17, 2009  (KR) .................. 10-2009-0126377

(51) Int. Cl.
| | | |
|---|---|---|
| G05B 15/00 | (2006.01) | |
| G06F 15/16 | (2006.01) | |
| G06F 15/167 | (2006.01) | |
| H04L 12/26 | (2006.01) | |
| H04L 12/28 | (2006.01) | |

(52) U.S. Cl.
CPC ........ H04L 43/0817 (2013.01); H04L 12/2809 (2013.01)
USPC ............... 700/1; 709/201; 709/213; 709/217

(58) Field of Classification Search
CPC combination set(s) only.
See application file for complete search history.

(56) References Cited

U.S. PATENT DOCUMENTS

| | | | | |
|---|---|---|---|---|
| 5,289,362 | A  * | 2/1994 | Liebl et al. ..................... | 700/22 |
| 5,436,510 | A  * | 7/1995 | Gilbert ........................... | 307/38 |
| 5,706,191 | A  * | 1/1998 | Bassett et al. ................... | 700/9 |
| 5,962,992 | A  * | 10/1999 | Huang et al. ................... | 315/312 |
| 6,061,668 | A  * | 5/2000 | Sharrow ......................... | 705/400 |
| 6,345,294 | B1 * | 2/2002 | O'Toole et al. ................ | 709/222 |
| 6,757,723 | B1 * | 6/2004 | O'Toole et al. ................ | 709/222 |
| 7,379,791 | B2 * | 5/2008 | Tamarkin et al. .............. | 700/286 |
| 8,156,055 | B2 * | 4/2012 | Shimada et al. ............... | 706/12 |
| 8,335,943 | B2 * | 12/2012 | Kamath et al. ................. | 714/4.1 |
| 8,683,236 | B2 * | 3/2014 | Ukita et al. .................... | 713/300 |
| 2001/0056305 | A1 * | 12/2001 | Moriya et al. ................. | 700/23 |
| 2002/0000792 | A1 * | 1/2002 | Hanaki .......................... | 323/234 |
| 2003/0055922 | A1 * | 3/2003 | Kim et al. ...................... | 709/220 |
| 2003/0097452 | A1 | 5/2003 | Kim et al. | |
| 2004/0059817 | A1 * | 3/2004 | Ueno et al. .................... | 709/224 |
| 2004/0095237 | A1 * | 5/2004 | Chen et al. .................... | 340/506 |
| 2005/0002408 | A1 | 1/2005 | Lee | |
| 2005/0096753 | A1 * | 5/2005 | Arling et al. .................. | 700/11 |
| 2005/0185595 | A1 * | 8/2005 | Lee ................................ | 370/252 |
| 2005/0226224 | A1 * | 10/2005 | Lee et al. ....................... | 370/352 |

(Continued)

*Primary Examiner* — Kavita Padmanabhan
*Assistant Examiner* — Thomas Stevens
(74) *Attorney, Agent, or Firm* — McKenna Long & Aldridge LLP

(57) ABSTRACT

Provided is a method of controlling a network system. In the method, information about an electric product comprising a communication modem is recognized to make the electric product join a power management network. The electric product is registered in the power management network by allocating an ID (identification) to the electric product.

16 Claims, 9 Drawing Sheets

(56) References Cited

U.S. PATENT DOCUMENTS

| | | | |
|---|---|---|---|
| 2006/0117387 A1* | 6/2006 | Gunsalus et al. | 726/24 |
| 2006/0259184 A1* | 11/2006 | Hayes et al. | 700/221 |
| 2007/0130598 A1 | 6/2007 | Choi et al. | |
| 2008/0125912 A1* | 5/2008 | Heilman et al. | 700/275 |
| 2009/0195349 A1* | 8/2009 | Frader-Thompson et al. | 340/3.1 |
| 2010/0217450 A1* | 8/2010 | Beal et al. | 700/291 |

* cited by examiner

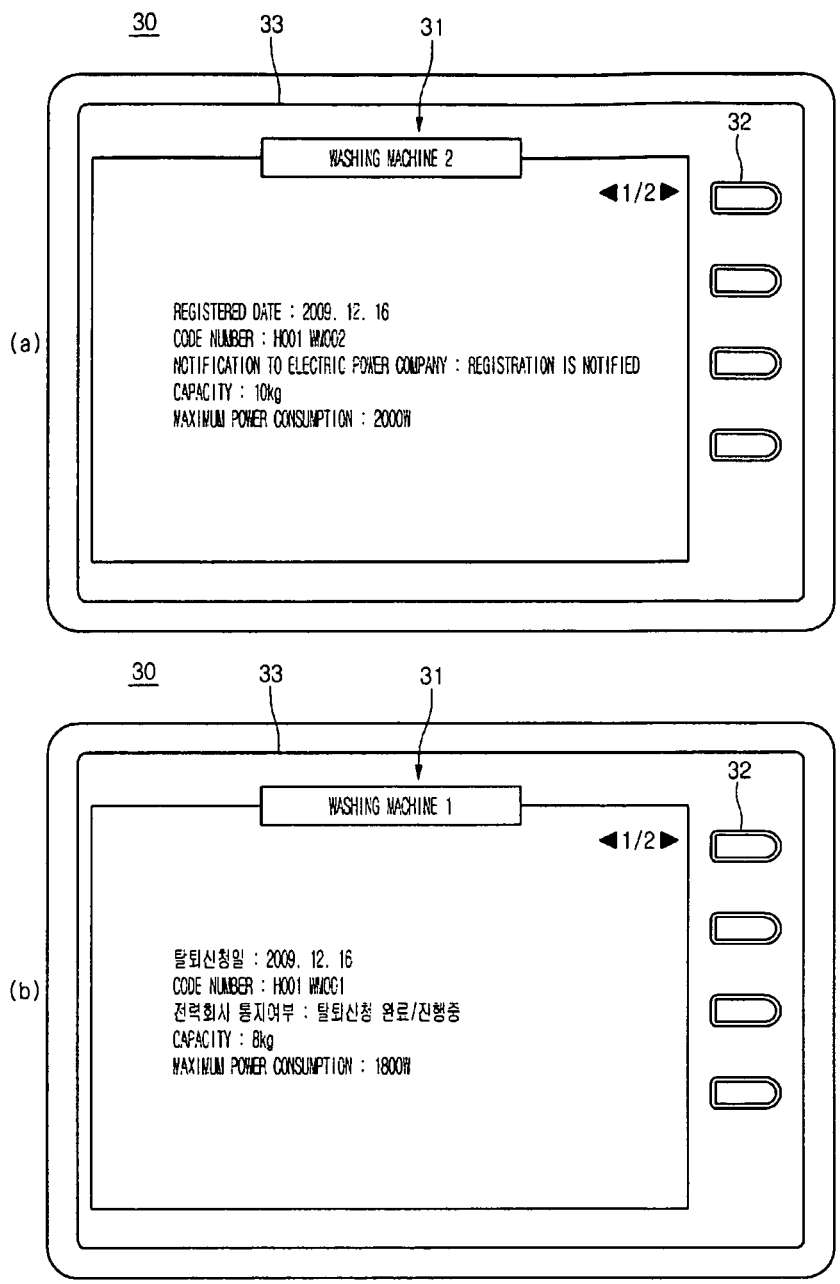

POWER MANAGEMENT SYSTEM AND METHOD OF CONTROLLING NETWORK SYSTEM

This application claims the benefit of priority of PCT Application No. PCT/KR2010/008431 filed on Nov. 26, 2010 which claims the benefit of priority of Korean Application No. 10-2009-0126376 filed on Dec. 17, 2009 and Korean Application No. 10-2009-0126377filed on Dec. 17, 2009, all of which are incorporated by reference in their entirety herein.

TECHNICAL FIELD

The present disclosure relates to a power management system and a method of controlling a network system.

BACKGROUND ART

Electric products operate while consuming electric energy. Since electric products consume electric energy, the amount of electricity consumption or electricity charge may be a sensitive matter to users.

As energy consumption increases, it is necessary to develop more energy sources and produce more electric energy. However, electricity generation causes a large amount of greenhouse gas and environmental problems such as global warming. To reduce emission of greenhouse gas, particularly, carbon dioxide, alternative energy sources have been developed such as wind power, solar light, solar heat, geothermal power, tidal power, and water power as well as nuclear power and fuel cells.

Along with this, a smart grid has been proposed as the next generation power grid to improve energy efficiency by realizing two-way and real-time information exchange between power providers and consumers in a way of applying information technology (IT) to the existing power grid.

DISCLOSURE OF INVENTION

Technical Problem

Embodiments provide a power management system and a method of controlling a network system for power management using power information received and transmitted through a communication unit.

Solution to Problem

In one embodiment, there is provided a method of controlling a network system, the method including: recognizing information about an electric product comprising a communication modem to make the electric product join a power management network; and registering the electric product in the power management network by allocating an ID (identification) to the electric product.

The details of one or more embodiments are set forth in the accompanying drawings and the description below. Other features will be apparent from the description and drawings, and from the claims.

Advantageous Effects of Invention

According to the embodiments, an electric product communicates through a communication modem to join a power management network executing a power management program so that the electric product can be operated according to the power management program for reducing electricity charge and power consumption.

In addition, when an electric product is connected to a power management network, a unique home code is allocated to the electric product to avoid confusion with an instruction from another power management network.

BRIEF DESCRIPTION OF DRAWINGS

FIGS. 8, 9A, and 9B are views illustrating an EMS according to the second embodiment.

BEST MODE FOR CARRYING OUT THE INVENTION

Reference will now be made in detail to the embodiments of the present disclosure, examples of which are illustrated in the accompanying drawings.

Figure 1:
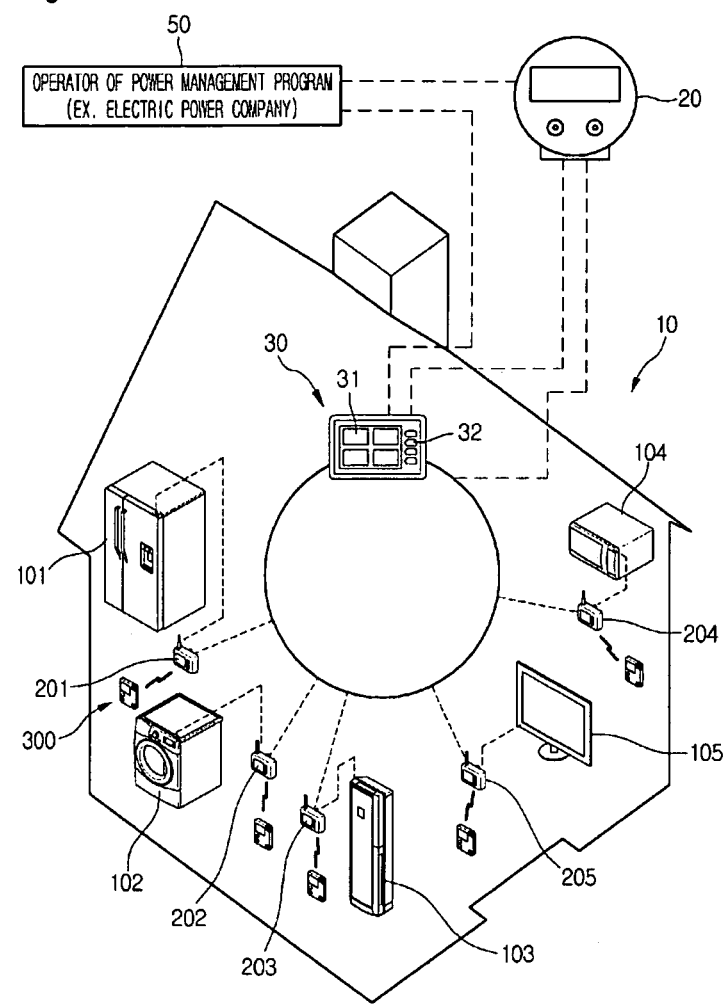
FIG. 1 is a schematic view illustrating a network system of an embodiment.

FIG. 1 is a view illustrating a network system 10 according to an embodiment.

Referring to FIG. 1, the network system 10 includes: a metering device (smart meter) 20 which can measure power supplied to a residential customer and the electricity charge of the power in real time; and an energy management system (EMS) 30 connected to the metering device (smart meter) 20 and a plurality of electric products such as home appliances.

Here, the electricity charge is measured based on an electricity rate. The electricity rate is high in a time period where power consumption increases steeply and low in a time period such as midnight where a relatively small amount of power is consumed.

The network system 10 is operated by a power management program made to efficiently mange electricity charges and power consumptions in the residential customer according to time-varying electricity rates.

For executing the power management program, the EMS 30 and the metering device (smart meter) 20 communicates with an operator 50 of the power management program, such as an electric power company.

The EMS 30 may be provided in the form of a terminal, which includes a screen 31 to display the current power consumption state and external environments (temperature, humidity) and an input unit 32 to receive user's manipulations.

The EMS 30 and the metering device (smart meter) 20 are selectively or simultaneously connected to the electric products such as a refrigerator 101, a washing or drying machine 102, an air conditioner 103, a TV 105, and a cooking device 104 through an in-house power management network for communicating with them.

Communication modems 200 (201 to 205) are detachably provided to the electric products for wireless communication with the EMS 30 and the metering device (smart meter) 20.

The communication modems 200 may be coupled to the outsides of the electric products for each attachment and detachment. Alternatively, the communication modems 200 may be fixed in the insides of the electric products when the electric products are manufactured.

The communication modems 200 are operated according to ZigBee (wireless communication method) for communications such as one-to-one, one-to-many, and many-to-many communications. However, the communication method of the communication modems 200 is not limited to ZigBee. Other wireless communication methods may be used.

Therefore, power information or operation information of the electric products provided with the communication modems 200 can be transmitted to the EMS 30 or the metering device (smart meter) 20 through the communication modems 200, and information can be transmitted in the opposite direction.

Slots or ports may be formed in the electric products for attaching and detaching the communication modems 200.

A power management network binder 300 (hereinafter referred to as a binder 300) is provided to register the electric products to the network system 10. The binder 300 communicates with the communication modems 200 of the electric products to allocate home codes and product codes (identifications (ID) related to products) to the electric products which are not registered to the network system 10.

In this way, the communication modems 200 and the electric products are registered in the network system 10.

Figure 2:
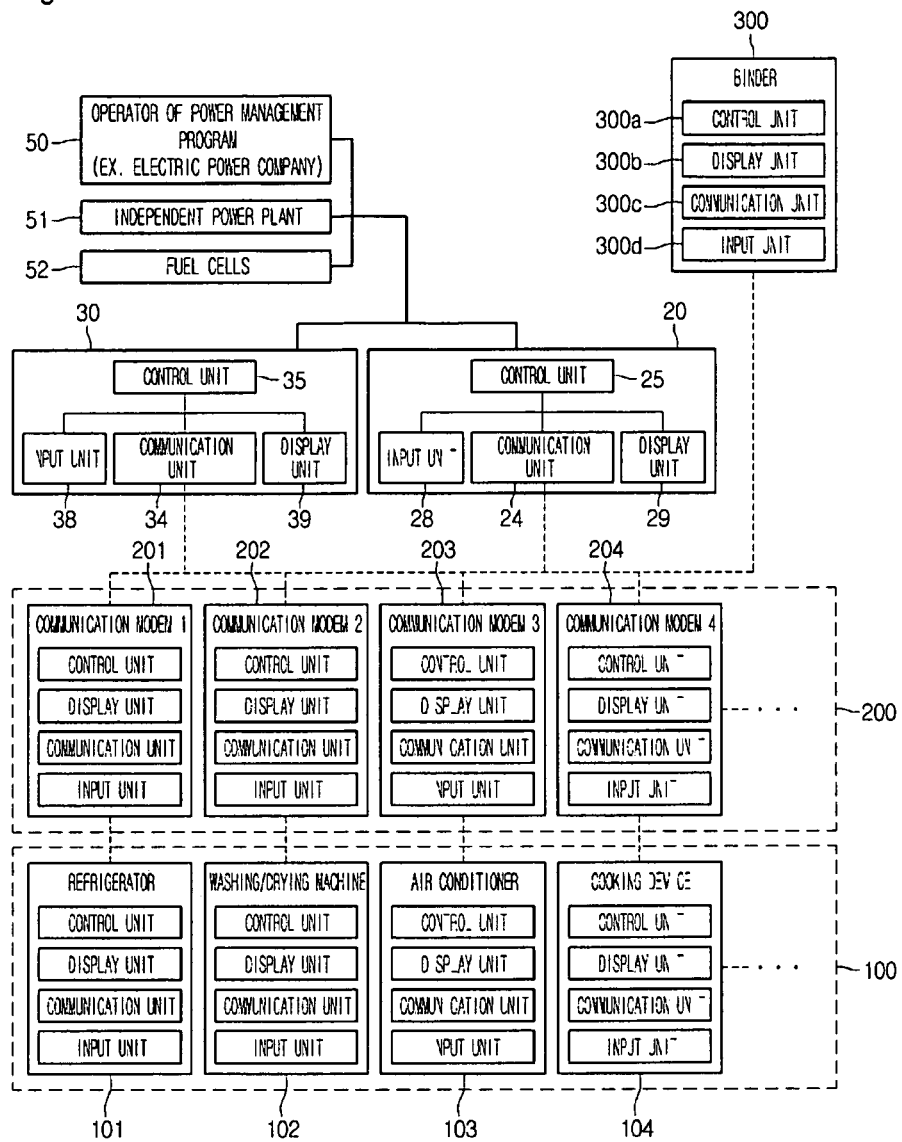
FIG. 2 is a control block diagram illustrating the network system according to an embodiment.

FIG. 2 is a control block diagram illustrating the network system 10 according to an embodiment.

Referring to FIG. 2, the power management program operator 50 may have a general power generation plant (e.g., thermal power, nuclear power, and water power generation plants) or a power generation plant using renewable energy sources (e.g., solar light, wind power, and geothermal power). However, the power management program operator 50 is not limited thereto.

In addition, the network system 10 may include an independent power plant 51 such as a solar power generation plant of a residential customer, and fuel cells 52 of a fuel cell vehicle or a residential customer.

Such power supply sources and the power management program operator 50 are connected to the metering device (smart meter) 20 and the EMS 30.

In addition, the metering device (smart meter) 20 and the EMS 30 can communicate with the electric products (denoted by reference numeral 100 in FIG. 2) through the communication modems 200.

The EMS 30 may include a control unit 35, an input unit 38, a communication unit 34, and a display unit 39, and the metering device (smart meter) 20 may include a control unit 25, an input unit 28, a communication unit 24, and a display unit 29.

The communication units 34 and 24 communicate with the communication modems 201 to 204 of the electric products 100 such as the refrigerator 101, the washing or drying machine 102, the air conditioner 103, and the cooking device 104 for transmitting and receiving power information and operation information.

At least one of the control units 25 and 35 of the metering device (smart meter) 20 and the EMS 30 checks information in real time, such as setting information input by a user through the input unit 28 or 38, accumulated operation and power consumption history information of the electric products 100, and external power supply information.

At least one of the EMS 30 and the metering device (smart meter) 20 processes such information to control operations of the electric products 100 and power supply to the electric products 100.

The display units 29 and 39 may display power information of the power supply sources or operation and power information of the electric products 100, and communication states of the electric products 100.

The EMS 30 or the metering device (smart meter) 20 controls operations of the electric products 100. The EMS 30 or the metering device (smart meter) 20 provides an electricity charge saving mode for saving electricity charges of the electric products 100, and an energy-saving operation mode for reducing power consumption. In the current embodiment, the EMS 30 or the metering device (smart meter) 20 may function as a management component to manage power of the electric products 100.

The electricity charge saving mode is performed based on electricity rates varying according to operation times of the electric products 100.

The EMS 30 or the metering device (smart meter) 20 controls the electric products 100 in consideration of a peak time period the electricity rate of which is higher than a reference value, or in consideration of an upper limit of power consumption or electricity charge.

The electric products 100 may be operated in the electricity charge saving mode in consideration of a peak time period or an upper limit of power consumption by joining the power management program provided by the electric power company.

If electric power is managed by joining a power management program, electricity charge may be saved, and moreover other effects may be attained such as getting a benefit of electricity charge reducing policies.

The communication modems 201 to 204 may include control units, display units, communication units, and input units. The communication modems 201 to 204 may display current communication states and receive user's inputs. The communication modems 201 to 204 may store IDs allocated to the electric products 100.

The communication modems 201 to 204 are connected to the EMS 30 or the metering device (smart meter) 20 for communication, so that the communication modems 201 to 204 can receive an instruction of the power management program from the EMS 30 or the metering device (smart meter) 20 and deliver the instruction to the electric products 100. Thus, the electric products 100 can be controlled according to the power management program.

In addition, the control units of the communication modems 200 may be configured to control the electric products 100 according to time-varying electricity rates, an upper limit of electricity charge, or an upper limit of power consumption. That is, the electric products 100 may operate in power-saving operation mode such as electricity charge saving mode or energy-saving operation mode under self control conditions using the communication modems 200.

Each of the electric products 100 may include a display unit and a control unit. The display unit may display an operation state of the electric product 100 and a communication state of the communication modem 200 of the electric product 100.

Therefore, a user can easily check communication states of the communication modems 200 through the display unit of the EMS 30, the metering device (smart meter) 20, the communication modems 200, or the electric products 100, and if any one of the communication modems 200 is abnormal, the user can reinstall the communication modem 200 on the electric product 100 or replace the communication modem 200.

The binder 300 may include a control unit 300a, a display unit 300b, a communication unit 300c, and an input unit 300d. As described above, the binder 300 is used to allocate home codes to the electric products 100 which are not registered in a power management network.

In this way, non-registered electric products 100 are registered in the network system 10 and become members of a power management network enhanced with a power management program provided by an electric power company. Therefore, the electric products 100 can be operated in a way of reducing electricity charge, power consumption, or carbon dioxide emission.

The communication unit 300c communicates with a communication unit of an electric product to be registered, and the input unit 300d receives a registration instruction for the electric product to be registered. Generally, a user may input a registration instruction by manipulating the input unit 300d with a finger.

The control unit 300a is connected to the display unit 300b, the communication unit 300c, and the input unit 300d. If an instruction is input for registering an electric product, the control unit 300a performs a control operation so that a home code transmission instruction related to the in-house power management network can be output.

At this time, a control instruction may be output to allocate a product code and a unique ID code as well as the home code.

Communication states of the communication modems 200 and registered states of the electric products 100 may be displayed on display units of the communication modems 200 and the electric products 100.

Figure 3:
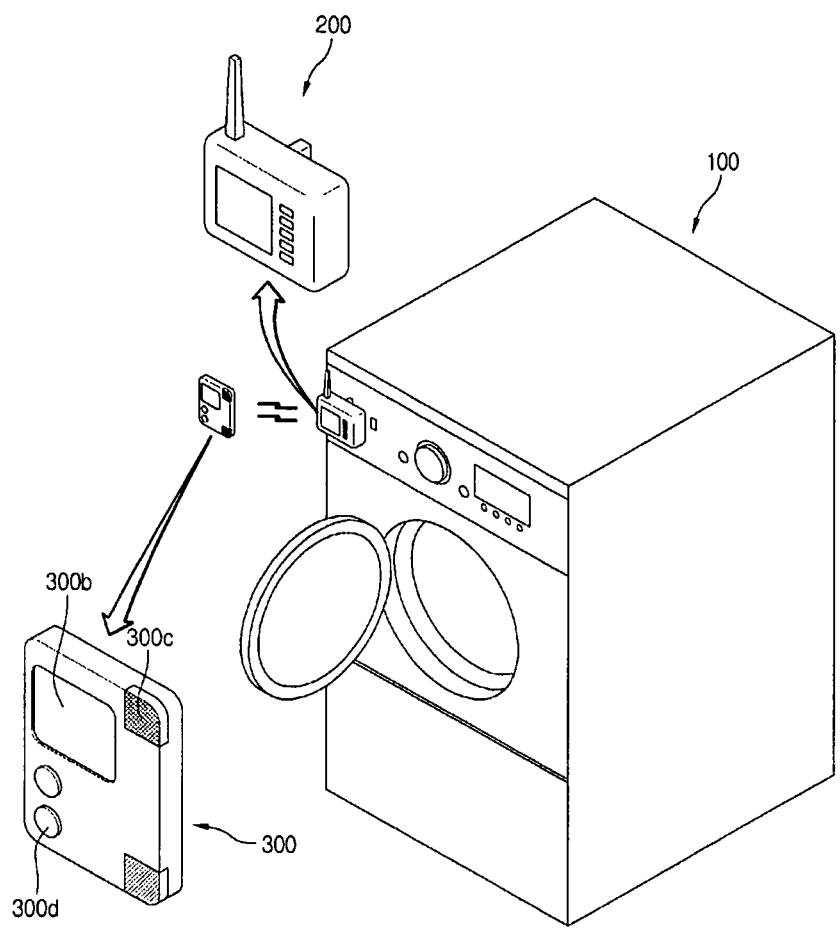
FIG. 3 is a perspective view illustrating a power management network binder and an electric product to be registered according to an embodiment.

FIG. 3 is a perspective view illustrating the power management network binder 300 and the electric product 100 to be registered according to an embodiment.

Referring to FIG. 3, in a state where the communication modem 200 is attached to the non-registered electric product 100, the binder 300 is moved close to the communication modem 200, and the input unit 300d having a button shape is pressed. Then, the non-registered electric product 100 is registered through the above-described procedures.

At this time, a home code, a product code, and a unique ID code may be displayed on the display unit 300b for a user to recognize them easily.

The registration process including home code allocation is carried out between the binder 300 and the communication modem 200 by a short distance communication method allowing communication only within a short distance. Thus, the registration process does not affect the other electric products.

In the current embodiment, the binder 300 is illustrated as an independent part.

However, the binder 300 may be a part of the management component or disposed in the management component.

Figure 4:
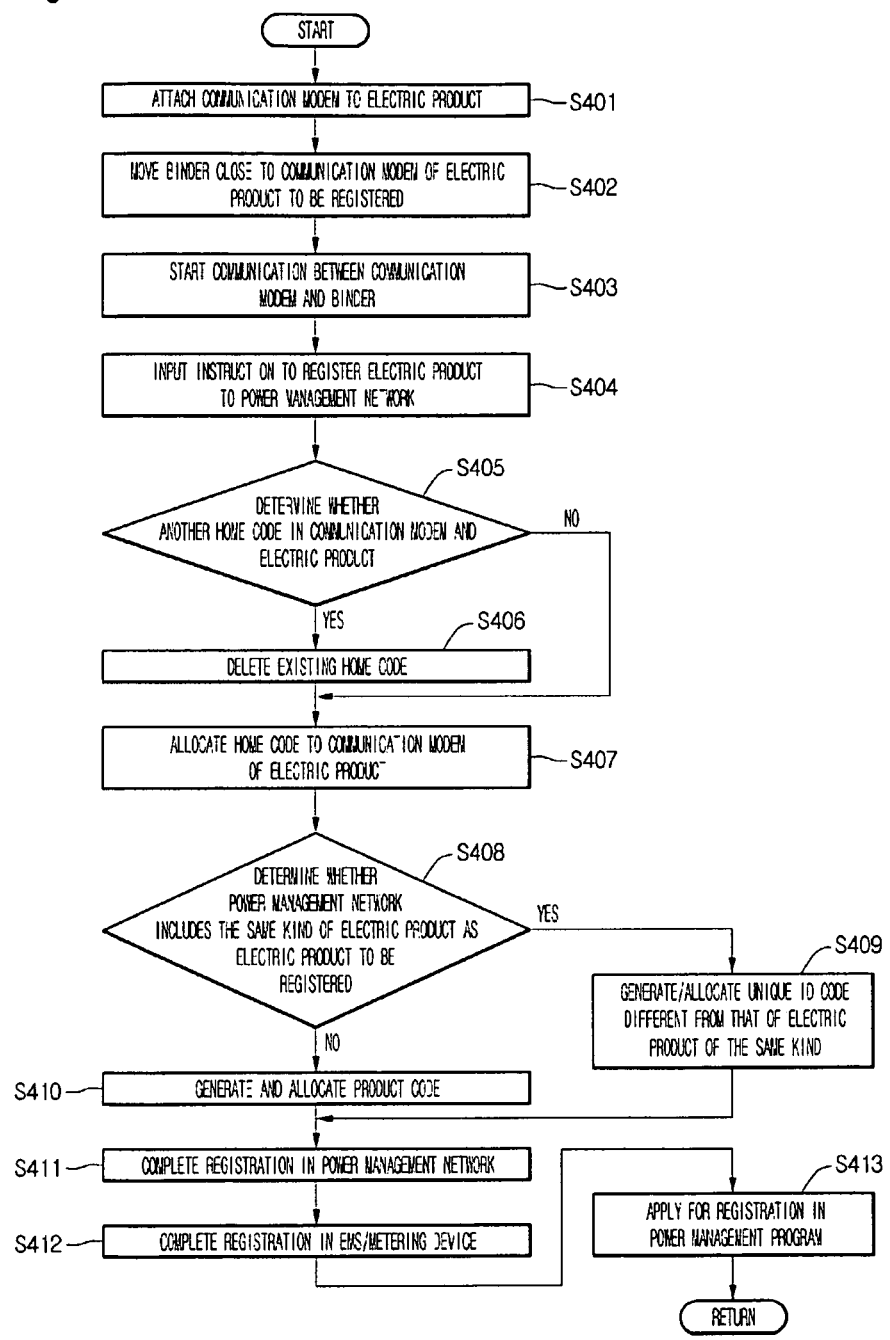
FIG. 4 is a flowchart for explaining a method of registering an electric product in a power management network according to a first embodiment.

FIG. 4 is a flowchart for explaining a method of registering an electric product in a power management network according to a first embodiment.

Referring to FIG. 4, a communication modem is attached to an electric product to be first registered (S401). A user moves a binder close to the communication modem of the electric product to be registered (S402). The communication modem of the electric product to be registered starts to communicate with the binder (S403).

A registration instruction is input by manipulating an input unit of the binder (S404).

The binder determines whether a home code of another power management network is in the communication modem and the electric product to be registered (S405). If there is another home code, the other home code is deleted by an instruction of the binder 300 (S406).

Then, the binder 300 communicates with the communication modem of the electric product to allocate a new home code (S407). If the communication modem and the electric product are new products and thus another home code is not in the communication modem and the electric product, the home code deleting operation S406 may be omitted and the new home code may be allocated.

Next, it is determined whether the same kind of electric product as the newly registered electric product is included in registered products of the power management network (S408).

Different controlling methods are used for different kinds of electric products in the power management network. Thus, if there are a plurality of electric products of the same kind, it is necessary to distinguish them to avoid confusion in executing a control instruction.

For example, there may be controlling methods for a cooking operation and a defrosting operation of a cooking device, a rapid cooling operation and a defrosting operation of a refrigerator, and a dehumidification operation, a cooling operation, and a heating operation of an air conditioner. That is, different controlling methods may be used for different electric products, and the same controlling method may be used for the same kinds of electric products. Thus, it is necessary to distinguish the electric products.

In operation S408, if it is determined that the same kind of electric product does not exist, the binder generates a product code corresponding to the kind of the electric product and allocates the product code to the electric product for executing a controlling method according to the kind of the electric product (S410).

On the other hand, if it is determined that the same kind of electric product exists, a unique ID code different from the product code of the same kind of electric product is generated and allocated to the electric product (S409).

The electric product is registered in the power management network in a state where the electric product can be distinguished from the other electric products registered in the power management network (S411).

In this way, the electric product is registered in an EMS or a metering device (S412). The EMS or the metering device informs an operator of a power management program that the electric product is newly registered, and provides the operator with power information and operation information of the electric product, so that the electric product can be applied for registration in the power management program for reducing electricity charge and power consumption (S413).

In this way, by informing the operator of the power management program of information about the newly registered electric product, the newly registered electric product can be controlled according to the power management program.

Figure 5:
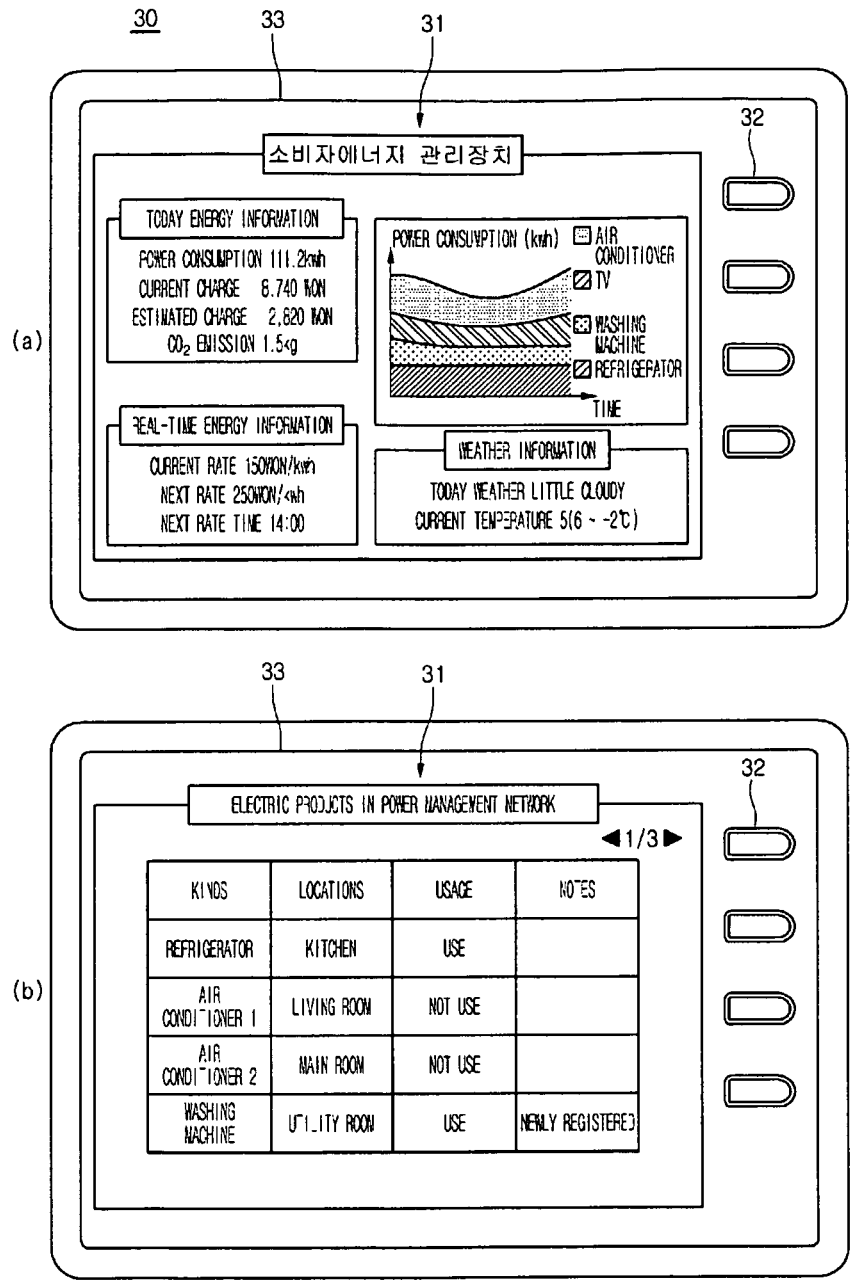
FIGS. 5A, 5B, and 6 are views illustrating an energy management system (EMS) according to the first embodiment.
Figure 6:
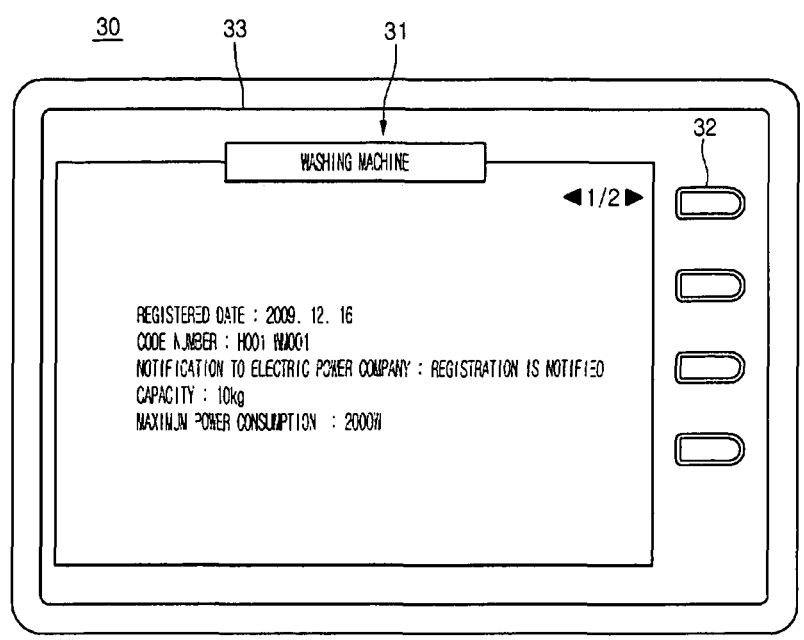

FIGS. 5A, 5B, and 6 are views illustrating the EMS according to the first embodiment.

Referring to FIGS. 5A, 5B, and 6, the EMS 30 may display information about registration of the electric product.

As shown in FIG. 5A, the EMS 30 may be a terminal including a touch panel 33.

A screen 31 may be displayed on the touch panel 33 to provide: today energy information about a current electricity consumption amount, a current electricity charge, an electricity charge estimated based on an accumulated consumption history, and a carbon dioxide emission amount; Real-time energy information about an electricity rate of a current time period, an electricity rate of a next time period, and a time at which the electricity rate varies; and weather information. In the current embodiment, information that can be obtained as the electric product operates (for example, power consumption amount, electricity charge, and estimated electricity charge) may be called energy information related to operations of an electric product.

In addition, a graph may be displayed on the screen 31 of the touch panel 33 to show power consumption amounts of electric products with respect to time.

In addition, a state information window may be displayed on the screen 31 to display communication states of the electric products so that a user can easily check whether communication modems connected to the electric products are operable for communication.

An input unit 32 is provided at a side of the screen 31 so that a user can input settings to the electric products using the input unit 32.

A user can select or set information relating to operations or power consumptions of the electric products by using the input unit 32, and according to the settings, the EMS 30 can communicate with the electric products and control the electric products.

As shown in FIG. 5B, states of electric products in the power management network may be displayed on the screen 31 in the form of a table containing information about the kinds, positions, and use/not-use states of registered electric products.

In addition, a special event such as a new registration may be displayed on the screen 31 to make a user have interest in the newly registered electric product.

As shown in FIG. 6, the newly registered electric product may be selected to get more information. Then, the screen 31 may display details of the newly registered electric product, such as kind, registered date, code number (for example, H001 is a home code, and WM001 is a product code and unique ID number), capacity, and maxima power consumption.

According to the embodiment, an electric product communicates through a communication modem to join a power management network executing a power management program so that the electric product can be operated according to the power management program for reducing electricity charge and power consumption.

In addition, when an electric product is connected to a power management network, a unique home code is allocated to the electric product to avoid confusion with an instruction from another power management network.

Figure 7:
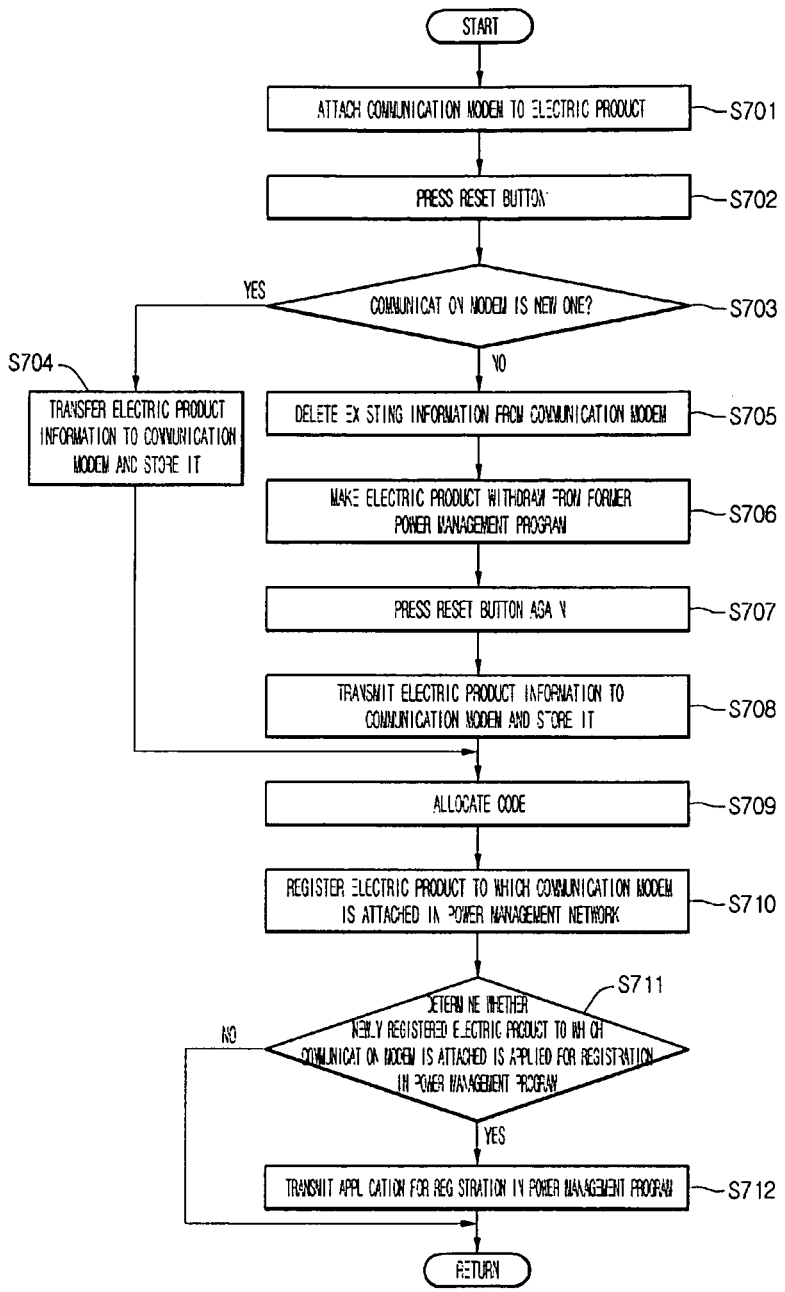
FIG. 7 is a flowchart for explaining a method of registering an electric product in a power management network according to a second embodiment.

FIG. 7 is a flowchart for explaining a method of registering an electric product in a power management network according to a second embodiment.

Referring to FIG. 7, a communication modem is attached to an electric product to be first registered (S701). A reset button of an input unit of the electric product, the communication modem, or a power management network binder is manipulated to reset the communication modem (S702).

After the reset button is pressed, it is determined whether the communication modem attached to the electric product is a new one or a one used for another electric product or power management network (S703).

If it is determined that the communication modem is a new one, it is not necessary to delete information from the communication modem, and thus information about the electric product connected to the communication modem is transmitted to and stored in the communication modem (S704).

On the other hand, if it is determined that the communication modem is a used one, information stored in the communication modem is first deleted (S705).

That is, information such as operation and power information of the former electric product connected to the communication modem is deleted. In addition, information about the former power management network or power management program is deleted.

At this time, if it is determined that the electric product is registered in the former power management program, a signal is generated for making the electric product withdraw from the former power management program (S706).

The withdrawal signal is transmitted to an operator of the former power management program through an EMS or a metering device.

After deleting the existing information and applying for withdrawal from the former power management program, the reset button is manipulated again (S707).

Then, information about the electric product which is currently connected to the communication modem is transmitted to the communication modem and stored in the communication modem (S708).

Thereafter, the communication modem communicates with an EMS or a metering device of the power management network for receiving an ID used to control the electric product (S709).

The ID includes a home code indicating the power management network, and a product code related to the kind of the electric product. If there is the same kind of electric product, the ID includes a unique ID number for distinguishing the electric product from the same kind of electric product.

After that, the electric product is registered in the power management network (S710).

Next, it is determined whether the newly registered electric product to which the communication modem is attached is applied by a user for registration in a power management program operated by an operator such as an electric power company (S711).

The power management program is a program prepared to control an electric product for adjusting electricity charge or power consumption. If there is a registration request from the power management network, the power management program informs the operator of the power management program of information about the newly registered electric product and the registration request of the electric product (S712).

In this way, the electric product is newly registered in the power management network, and the electric product can be controlled according to the power management program.

Figure 8:
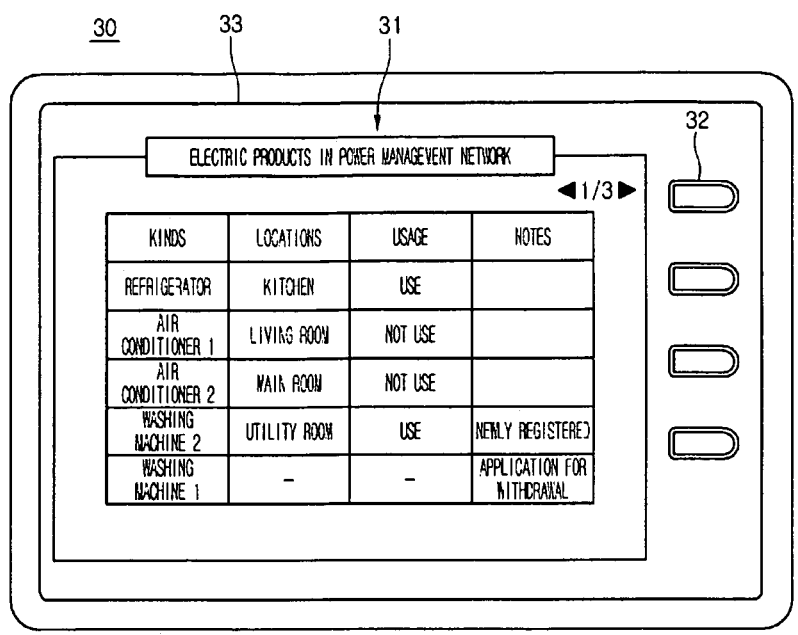

FIGS. 8, 9A, and 9B are views illustrating the EMS according to the second embodiment.

Referring to FIGS. 8, 9A, and 9B, a screen 31 of the EMS 30 may display information about registration of the electric product. The EMS 30 may display the same information as that displayed in the first embodiment A state information window may be displayed on the screen 31 to display communication states of electric products so that a user can easily check whether communication modems connected to the electric products are operable for communication.

An input unit 32 is provided at a side of the screen 31 so that a user can input settings to the electric products using the input unit 32.

A user can select or set information relating to operations or power consumptions of the electric products by using the input unit 32, and according to the settings, the EMS 30 can communicate with the electric products and control the electric products.

States of electric products in the power management network may be displayed on the screen 31 in the form of a table containing information about the kinds, positions, and use/not-use states of registered electric products.

In addition, a special event such as new registration in or withdrawal from the power management network or power management program may be displayed to make a user have interest in the newly registered or withdrawn electric product.

As shown in FIG. 9A, the newly registered electric product may be selected to get more information. Then, the screen 31 may display details of the newly registered electric product, such as kind, registered date, code number (for example, H001 is a home code, and WM001 is a product code and unique ID number), capacity, and maxima power consumption.

In addition, as shown in FIG. 9B, the screen 31 may display information about an electric product which is discarded or replaced with a new one and thus is withdrawn form the power management network.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of binding an electric product to a power management network system, the method comprising:
   communicating with a communication device of the electric product by a binder or a component in the power management network system;
   storing information in the electric product or the communication device corresponding to an ID (identification) allocated to the electric product by the binder or the component in the power management network system; and
   registering the electric product with the power management network system using the information corresponding to the ID allocated to the electric product,
   wherein if the electric product or the communication device has previously stored information corresponding to another ID related to another power management network system, then deleting the information corresponding to another ID from the electric product or the communication device is performed prior to storing information corresponding to the ID related to a current power management network system in the electric product or the communication device.

2. The method according to claim 1, wherein the electric product is registered to a management component that manages an operation of the electric product.

3. The method according to claim 1, wherein the information corresponding to the ID is allocated to the electric product by a management component that manages an operation of the electric product or the binder.

4. The method according to claim 1, wherein the information corresponding to the ID comprises a home code and a product code.

5. The method according to claim 4, wherein when the power management network system comprises the same kind of electric product as the registered electric product, then allocating a unique ID code to the registered electric product to distinguish the registered electric product from the same kind of electric product.

6. The method according to claim 1, wherein after the electric product is registered in the power management network system, displaying by a management component an operation state of the electric product.

7. The method according to claim 6, further comprising displaying by the management component energy information received from a power supply source or energy information related to an operation of the electric product.

8. A power management system comprising:
   a binder or a component in the power management system;
   a communication device associated with an electric product to communicate with the binder or the component in the power management network system; and
   wherein the electric product or the communication device stores information corresponding to an ID (identification) of the electric product allocated by the binder or the component in the power management system, and
   wherein if the electric product or the communication device has previously stored information corresponding to another ID related to another power management system, the binder or the component in the power management system deletes the information corresponding to another ID from the electric product or the communication device prior to storing information corresponding to the ID related to a current power management system in the electric product or the communication device.

9. The power management system according to claim 8, wherein the component manages an operation of the electric product and the electric product is registered with the management component.

10. The power management system according to claim 8, wherein the information corresponding to the ID is allocated to the electric product by the component which also manages an operation of the electric product or the binder.

11. The power management system according to claim 8, wherein the information corresponding to the ID comprises a home code and a product code.

12. The power management system according to claim 8, wherein when a power management network comprises the same kind of electric product as the registered electric product, the power management system allocates a unique ID code to the registered electric product to distinguish the registered electric product from the same kind of electric product.

13. The power management system according to claim 8, wherein after the electric product is registered, a display displaying an operation state of the electric product.

14. The power management system according to claim 13, wherein the display further comprises displaying energy information received from a power supply source or energy information related to an operation of the electric product.

15. A method of binding an electric product to a power management network system, the method comprising:
   communicating with a communication device of the electric product by a binder or a component in the power management network system;
   storing information in the electric product or the communication device corresponding to an ID (identification) allocated to the electric product by the binder or the component in the power management network system; and registering the electric product with the power management network system using the information corresponding to the ID allocated to the electric product, wherein if the electric product or the communication device has previously stored information corresponding to another ID and the information corresponding to the another ID is not related to another power management network system, then skipping the storing of the information corresponding to the ID related to a current power management network system, and registering the electric product with the current power management network system using the information corresponding to the another ID are performed.

16. A power management system comprising:

a binder or a component in the power management system;

a communication device associated with an electric product to communicate with the binder or the component in the power management network system; and wherein the electric product or the communication device stores information corresponding to an ID (identification) of the electric product allocated by the binder or the component in the power management system, and wherein if the electric product or the communication device has previously stored information corresponding to another ID and the information corresponding to the another ID is not related to another power management system, the binder or the component in the power management system skips the storing of the information corresponding to the ID related to a current power management system, and registers the electric product with the current power management system using the information corresponding to the another ID.

* * * * *